United States Patent [19]
Worrell

[11] 4,254,819
[45] Mar. 10, 1981

[54] PROTECTING ENTRY PORTIONS OF TUBES OF EMERGENCY COOLING SYSTEM

[75] Inventor: G. Richard Worrell, Media, Pa.

[73] Assignee: Atlantic Richfield Company, Los Angeles, Calif.

[21] Appl. No.: 84,230

[22] Filed: Oct. 12, 1979

[51] Int. Cl.³ .............................................. F28F 13/14
[52] U.S. Cl. .................... 165/1; 165/134 R; 165/135; 165/146; 165/178; 165/DIG. 14
[58] Field of Search ................... 165/1, 134, 135, 174, 165/178, 146, 132, DIG. 14

[56] References Cited
U.S. PATENT DOCUMENTS

| 2,252,069 | 8/1941 | Fletcher | 122/365 |
| 2,806,718 | 9/1957 | Cook et al. | 165/178 |
| 3,029,796 | 4/1962 | Simmons et al. | 165/134 |
| 3,592,261 | 7/1971 | Black | 165/178 |
| 3,707,186 | 12/1972 | Zorrilla et al. | 165/134 |

FOREIGN PATENT DOCUMENTS

| 1205121 | 11/1965 | Fed. Rep. of Germany | 165/134 |
| 1371991 | 12/1964 | France | 165/134 |

Primary Examiner—Sheldon J. Richter
Attorney, Agent, or Firm—John R. Ewbank

[57] ABSTRACT

The entry portions of the tubes of a Worrell-type emergency cooler are modified so that the peak temperature of said modified tube is maintained at less than about 650° F., thereby allowing carbon steel to be employed for heat transfer tubes. Such entry portions feature tubular members (conveniently called ferrules) having controlled thermal conductivity significantly greater than conventional insulators, but significantly less than conventional thermal conductors.

9 Claims, 10 Drawing Figures

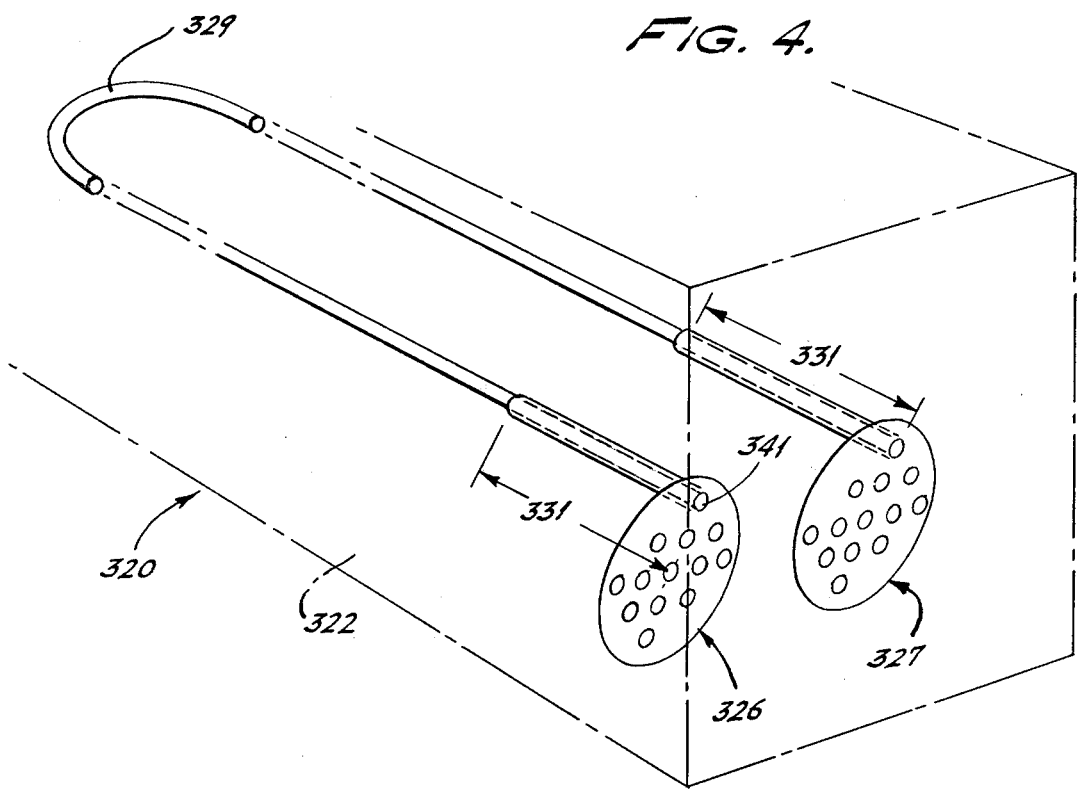
FIG. 4.
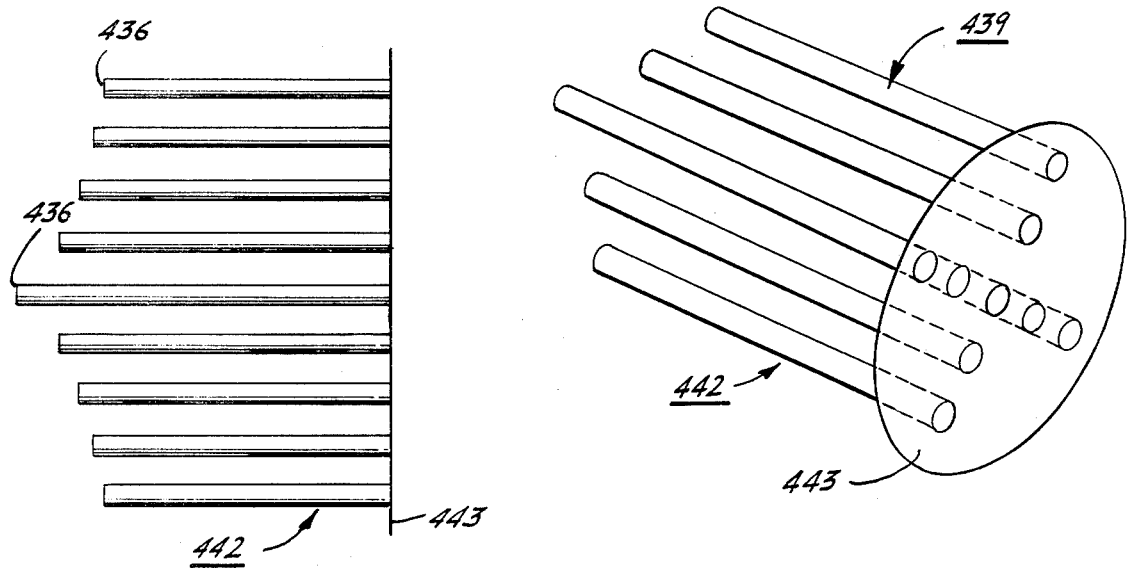
FIG. 5.
FIG. 5a.

PROTECTING ENTRY PORTIONS OF TUBES OF EMERGENCY COOLING SYSTEM

RELATED INVENTIONS

Reference is made to the copending application of G. R. Worrell and F. F. McKay, Ser. No. 860,791, filed Dec. 15, 1977, entitled "Reaction Boundary Suppressor Systems", now U.S. Pat. No. 4,192,656, and the copending applications of G. R. Worrell entitled "Flame Arrestor Systems for Pipelines", Ser. No. 921,546 filed July 3, 1978, now U.S. Pat. No. 4,192,657, and Ser. No. 921,636 filed July 3, 1978 entitled "Pipeline Flame Arrestor", now U.S. Pat. No. 4,192,658, all the disclosure of which three copending applications are incorporated herein and deemed here reiterated.

BACKGROUND OF INVENTION

1. Field of Invention

This invention relates to emergency coolers having large pools of quiescent liquid suceptible to rapid boiling away to cool an unscheduled emergency surge of heat. Some embodiments of this invention are flame arrestors for gas pipelines. This invention concerns protecting the entry portion of tubes of a heat exchanger from over-heating, while still cooling the flowing stream about half as much as without such protection.

2. Prior Art

Many tons of compressed ethylene have been transported over long distances by pipeline, notwithstanding the recognition that compressed ethylene does not have the same safety characteristics as compressed methane. As noted in the three ancestral applications referred to, it has been recently discovered that a flame arrestor having megawatt cooling capacity can quench a decomposition flame even though the flame front can have a temperature such as 3000° F. Some of the engineering work relating to such flame arrestor assumed that the heat transfer tubes would be of stainless steel, thereby being capable of withstanding satisfactorily an elevated temperature. The economic advantage of using conventional alloys instead of stainless steel was recognized initially, but the 3000° F. temperature of an ethylene decomposition flame provided justification for stainless steel.

Stephenson, U.S. Pat. No. 2,087,170 explains that check valves of a hydraulic nature have been employed as flame arrestors and proposes alternative flame arrestors for systems using acetylene at slight pressure. Although apparently aimed primarily at backfiring of combustible flames, Stephenson mentions caloric waves arising from the decomposition of acetylene. The flame front for the decomposition of acetylene is now known to migrate at a speed which is orders of magnitude faster than an ethylene decomposition flame front. Moreover, because acetylene is ordinarily compressed only to a slight pressure, the heat content per volume of acetylene decomposition is much lower than the heat content for the same volume of highly compressed ethylene. Stephenson, U.S. Pat No. 2,087,170 discloses a shell through which water is circulated to cool tubes in the very short flame arresting zone. Compressed acetylene ordinarily is piped only a short distance, whereas ethylene is sent by gas pipelines for significant distances, such as greater than a kilometer. Said Stephenson patent provided meagre guidance to ethylene technologists.

Heat exchangers for sulfur burners are designed for continuous, reasonably uniform heat content of the gas stream directed to the heat exchanger, and are also designed for the circulation of cooling liquid. In order to overcome some corrosion problems in such heat exchangers, ceramic insulating ferrules have been inserted at the entry portion of each tube and have extended for a few inches into the tube. Such ceramic ferrules protect the heat transfer tubes and help to overcome certain corrosion problems tending to occur at the point of joining of the tube and the tube sheet. The ceramic ferrules have been sensitive to thermal shock and have had propensities to spall and/or crack when rapid changes of temperature were encountered, but have served to protect against corrosion problems under uniform heat transfer conditions.

Notwithstanding the well-recognized cost advantage of using conventional steels when feasible, the use of stainless steel in a flame arrestor for an ethylene pipeline was deemed appropriate over a period of many months of design of such devices.

SUMMARY OF THE PRESENT INVENTION

In accordance with the present invention, a Worrell-type emergency cooling system is fabricated from conventional alloys and the initial portion of each of the tubes is provided with an entry zone, adapted to assure reliable performance using tubes of conventional alloys. The peak temperature for the metal in the heat exchanger tubes is thus kept as low as about 650° F. even when the temperature of portions of the heat surge can be of the magnitude of 3000° F. Each entry zone (both ends if designed for installing in either of the reversible positions) features heat transfer rates of the magnitude of half that of the principal zone because it is very important to prevent film boiling throughout the length of both at least one entry zone and said principal zone. Moreover, the entry zone must be long enough to cool the gas partially so that the unmodified portion of the tube (i.e., the principal zone) can cool the gas adequately, for example, to about 400° F. or less. If the emergency cooler is used as an ethylene flame suppressor, it is important that the possibility of rekindling of the decomposition flame front downstream be prevented by cooling to 400° F. or less.

By a series of tests it was established that the guard tubes imparting the controlled thermal conductivity of the entry zone must be at least 2 feet long and thus significantly longer than the ceramic ferrules of sulfur-oxide heat exchangers. However, such zone of controlled thermal conductivity must not go beyond about 30% of the length of the tube and must not exceed 8 feet. Because the length of the entry zone must be within the range from about 2 feet to about 8 feet and because the controlled thermal conductivity characteristics of the entry zone must meet certain objectives, there are ranges in the thermal conductivity characteristics which are permissible. If the controlled thermal conductivity of the combination of the guard tube and the heat transfer tube is relatively small, then a greater length of the entry zone is necessary. If the thermal conductivity is relatively great, then the guard tube at the entry zone can be shorter.

It is important that film boiling be prevented throughout the length of the emergency cooling zone. In the absence of the present invention, bubbles of vapor can form on the surface of a lower heat transfer tube and move upwardly at such a rapid rate that at the surface of an upper tube, there is the substantial absence of a liquid film. Heat transfer falls off rapidly, and the tube wall heats rapidly. This is known as film boiling.

To prevent film boiling, thermal conductivity in the entry zone is controlled generally in the range of 0.05 to 1.6 BTU per hour per square foot of barrier per degree F per foot of thickness of such barrier. If the modifying material is a solid instead of a gas, then the modifying material must have a thermal conductivity controlled to be in the range from 0.3 to 1.6 BTU/hr/sq.ft./°F/ft. It is noted that most conventional thermal insulating solids have a thermal conductivity significantly less than said 0.3 BTU/hr/ft$^2$/°F./ft, and that most conventional thermal conductors have a thermal conductivity significantly greater than 1.6 BTU/hr/ft$^2$/°F./ft. The metal layers in the modified zones have much greater thermal conductivity than said desiderata. Metal members are desirably included in the guard tube, so that the flow of heat from the flowing fluid stream to the cooling liquid is through a plurality of lamina, sometimes comprising a lamina of metal of the shell of the guard tube, a lamina of controlled composition (sandwich filling), the lamina of the heat transfer tube, and possibly a metal lamina adjacent said controlled composition layer. The thickness of the layer of controlled composition is generally within the range from about 0.01 to about 0.20 inch. If the modifying zone features a gas, then the thickness of the gas may be significantly less than 0.20 inch, possibly as thin as 0.01 inch. A gas having the same composition as the gas being cooled is ordinarily the modifying gas. If the modifying zone features a solid, its thickness is generally near 0.1 to 0.2 inch. The combination of thermal conductivity and thickness of each of the plurality of layers is adjusted to give effective heat transfer coefficients from the compressed gas stream to the cooling liquid in the range of about 30 to about 120 BTU per hour per square foot of barrier per degree F at the contemplated peak temperature. Such rate of heat transfer is often approximately half (e.g., ¼ to 11/16) of the rate of heat transfer in the absence of the guard tube, but much more than could flow at the peak temperature through a temperature acclimated insulating ferrule of the type used in sulfur oxide plants.

To prevent film boiling downstream of the entry zone, the gas and flames must be appropriately cooled. Thus, a length of about 2 feet to about 8 feet is required to cool the gas adequately and avoid film boiling downstream of the entry zone. Ordinarily the guard tubes will be designed to be as short as feasible while meeting the heat transfer requirements of the contemplated heat surge and using the selected lamina for such guard tubes.

In preferred embodiments, a bundle of stainless steel guard tubes extending from a guardsheet is inserted into the array of heat transfer tubes. The guard tubes have carefully controlled dimensions, as do the sandwich zones between the guard tube and the heat transfer tube. Moreover, such sandwich zone has a regulated thickness of a controlled composition of selected heat transfer coefficient. Such combination of the stainless steel ferrule (guard tube), the steel heat transfer tube, and the material sandwiched therebetween modifies the thermal conductivity characteristics for preventing the undesired film boiling during a heat surge.

The invention is further clarified by detailed descriptions of a few illustrative but non-limiting embodiments.

DRAWINGS

FIG. 4 is a diagramatic showing partly in phantom a portion of a cooling device featuring a pair of modified zones in accordance with the present invention.

FIG. 5 and 5a are schematic showings of tube sheet assemblies of heat protective ferrules suitable for insertion during manufacture into an assembly of heat transfer tubes (FIGS. 1–3) for providing modified zones in accordance with the present invention.

DESCRIPTION OF EMBODIMENTS

Figure 1:
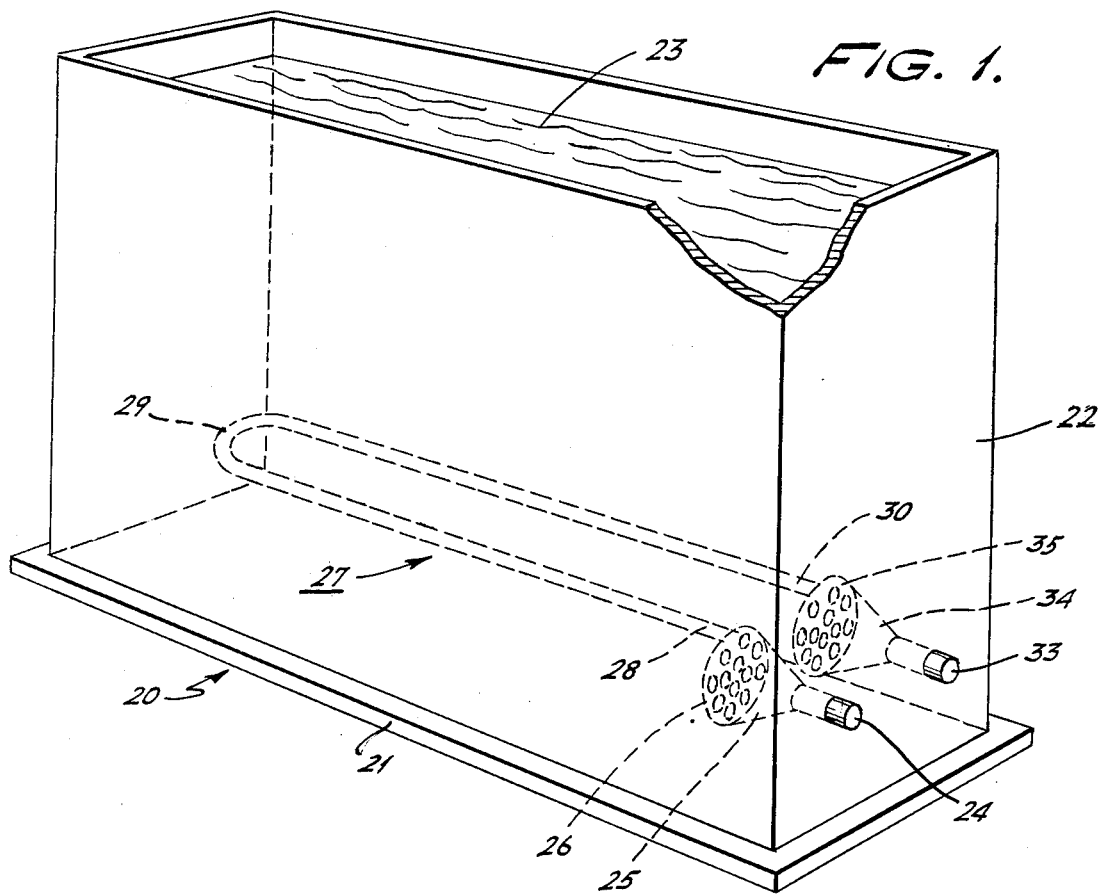
FIG. 1 is a schematic perspective view of the general type of Worrell-type emergency cooling device shown in the patents identified in the paragraph on Related Inventions.

As shown in FIG. 1, an emergency cooling device 20 illustrates apparatus of the general type disclosed in the patents discussed as Related Inventions. Such cooling device 20 includes a base 21 from which extend the four walls of a rectangular vat 22 (analogous component designated as a shell by heat exchanger technologists, but "vat" used herein to emphasize evaporation from dormant pool and to exclude enclosed circulating of cooling liquid) adapted to contain a heat transfer liquid 23 such as a corrosion inhibited mixture of about equal parts by weight of water and ethylene glycol. An inlet pipe 24 permits a fluid, usually a gas, to enter a submerged manifold 25 so that the gas is distributed to the openings in a submerged tube sheet 26. In FIG. 1, only a single heat transfer tube 27 is shown comprising an inlet portion 28, a U-bend 29, and an exit portion 30. However, it should be understood that there is an assembly of heat transfer tubes conducting the gas from inlet pipe 24 to outlet pipe 33 whereby the liquid 23 cools the flowing gas stream. The submerged exit manifold 34 and submerged exit tube sheet 35 function similarly to the corresponding inlet manifold 25 and inlet tube sheet 26. Ordinarily such cooling device 20 is designed for installation in either of the reversible possibilities so that the inlet could become the outlet if the gas were flowing in the reverse direction.

In the event that a gas stream having a warm surge enters through inlet pipe 24, it is directed through the inlet manifold 25 to the plurality of heat transfer tubes 27 to the exit manifold 34 and exit pipe 33. The liquid 23 in the cooler 20 effectively cools the gas stream so that the gas stream leaving through exit pipe 33 is cooled to a temperature near the ambient temperature which the cooling liquid had before the surge. As long as the warm surge is not a heavy heat load, there are few complications. However, when the heat surge requires megawatts of cooling within seconds, and/or when the temperature of the gas surge is of the general magnitude of 3000° F., there are complications. For example, some designs require stainless steel for most components. As explained in the previously identified patent applications relating to the Worrell-type emergency cooling, the cooling is achieved within seconds by reason of the liquid being heated as the gas is cooled. The reserve cooling capacity is attributable to the possibility of evaporation of the cooling liquid as the gas surge heats the liquid to boiling temperature and initiates the boiling away of the cooling liquid.

The temperature of an ethylene decomposition flame front is rapidly quenched from about 3000° F. to about 400° F. or less by the Worrell-type of emergency cooler. It has the potentiality of boiling away many gallons of liquid prior to the lowering of the liquid level to the uppermost heat transfer tube 27, thus affording megawatts of instant cooling capacity.

If the bubbles of steam or other vapor generated by a lower tube move upwardly past an upper tube at a rate beyond a threshhold value, there is a possibility for inadequate cooling of the gas in the upper tube. If the volume and velocity of such upward movement of vapor exposes a dry tube, such upper dry tube can overheat because it is not in contact with a liquid film of water. After the liquid is at boiling temperature, an excessive heat flux through any tube (as distinguished from bubble rise rate) can provide a dry tube. The tube wall is desirably protected from a troublesomely high temperature which can weaken the tube and cause rupture. The term "film boiling" embraces a family of problems relating to the failure of a heat transfer tube to have sufficient heat transfer contact with the liquid to prevent overheating of the metal wall of such heat transfer tube. The present invention is concerned with preventing "film boiling" and possible tube rupture in a Worrell-type emergency cooler.

Figure 2:
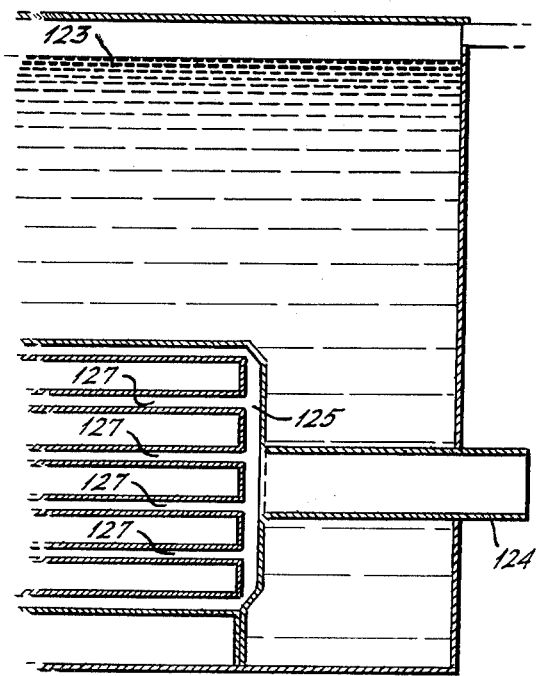
FIG. 2 is a side sectional view of a portion of a cooling device of the general type discussed in Related Inventions.

As shown in FIG. 2, a partially submerged inlet pipe 124 (suitable for connecting to an upstream portion of a gas pipeline) extends to an inlet manifold 125 which is submerged significantly beneath the surface of liquid coolant 123. Such manifold distributes gas to each of a plurality of heat transfer tubes 127.

Figure 3:
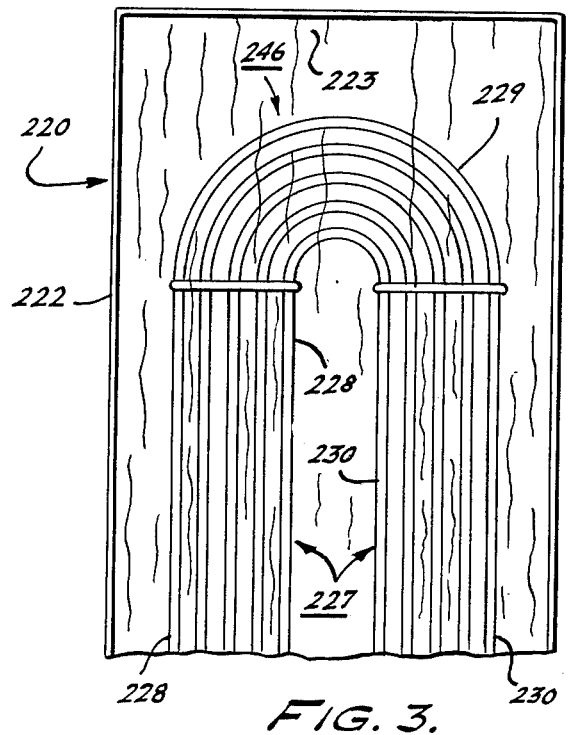
FIG. 3 is a top plan view of a portion of a cooling device of the general type shown in FIGS. 1 and 2.

As shown in FIG. 3, a bundle 246 of tubes have appropriate U-bends so that an outlet pipe can be positioned adjacent an inlet pipe. Each of the heat exchanger tubes 227 comprises an inlet portion 228, a U-bend portion 229, and an outlet portion 230, all immersed in cooling liquid 223. Most heat exchanger bundles have a circular cross section, but other arrangements of the tubes in a bundle are plausible. A rectangular cross section for the tube bundle is feasible.

Figure 6:
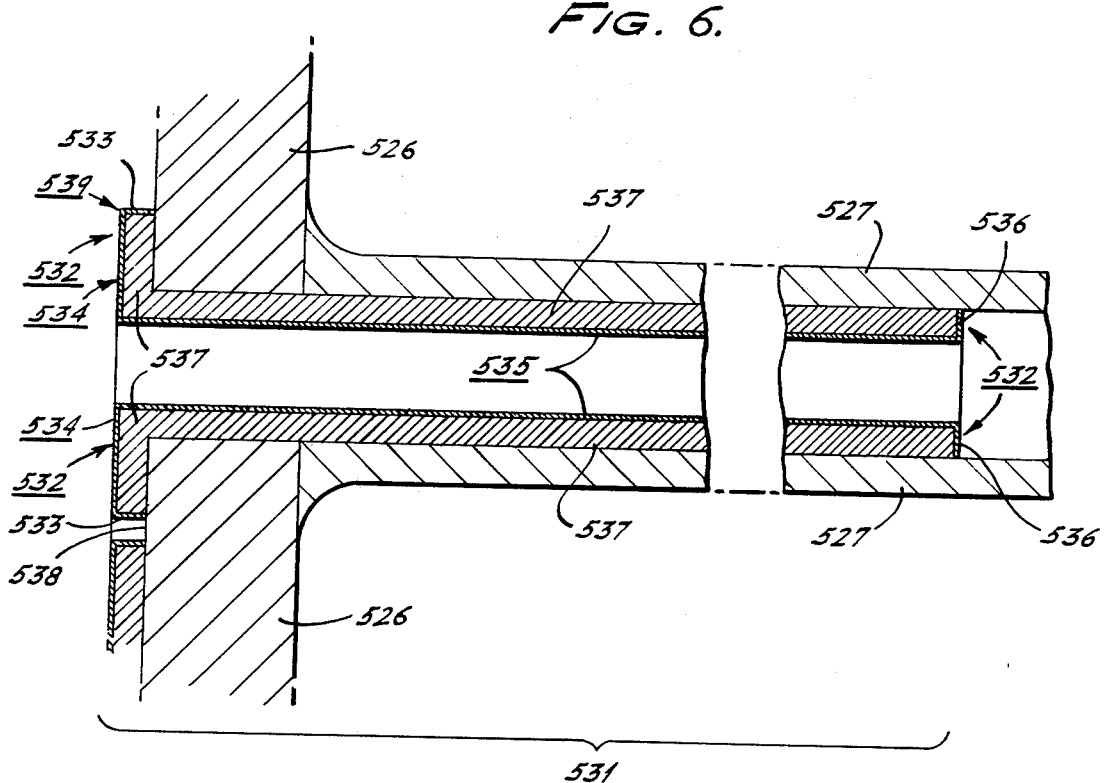
FIG. 6 is a sectional view of one embodiment of a heat guarding ferrule installed in a heat transfer tube of FIGS. 1–3.

As shown in FIG. 6, a zone 531 of controlled heat transfer rate is provided at the initial portion of a heat transfer tube. This zone 531 helps preserve some liquid at the liquid side of the heat transfer tube 527 while still effectively cooling the gas stream flowing within the tube, thus minimizing the likelihood of "film boiling." Such zone of controlled heat transfer 531 should extend for at least two feet, but for less than about 8 feet of the length of a heat transfer tube 527.

The present invention not merely decreases the possibility of "film boiling" in the unlikely event of a combination of adverse circumstances, but also makes feasible construction of a major portion of the cooler from conventional carbon steel. Although there is additional expense in providing the zone 531 of controlled heat transfer rate, such cost of the supplemental member is less than the cost of constructing the entire cooler of stainless steel to avoid rupture while withstanding a combination of adverse circumstances comprising a megawatt heat surge of about 3000° F.

As shown in FIG. 6, a heat transfer tube 527 having an inside diameter of about 1 inch, an outside diameter of about 1.5 inch, and a wall thickness of about 0.25 inch, is welded to an inlet tube sheet 526 having a thickness of about 4 to 6 inches. The present invention features a heat guarding ferrule 532 comprising a ferrule core 537 and a stainless steel shell 539. The ferrule core shown is constructed of carbon having some of the mechanical properties identified with resistors for electrical devices. An edge 533 of the stainless steel shell 539 abuts against the face of the tube sheet 526. A rim portion 534 of the ferrule 532 protects a portion of the tube sheet face from the heat of the gas. Heat exchange devices comprising similar rims adapted to protect the face of the tube sheet have been designated as heat guarding ferrules by analogy to ferrules having broad rims to protect holes from attrition and erosion. Such ferrule terminology has persisted for insulating ceramic tubes having relatively small rims, but adapted to guard an entry zone of a heat exchanger by significantly insulating the joint at the tubesheet. Such ferrule terminology for heat guarding tubes at the entry zone of a heat exchanger is accepted terminology in the heat exchanger art without regard to structural resemblance to conventional ferrules, such as the cylindrical clamp holding an easer onto a pencil.

A cylindrical portion 535 of ferrule 532 extends throughout the zone of controlled heat transfer. The inside diameter of such cylindrical portion is generally at least 60% of the inside diameter of the heat transfer tube 527 in order to avoid excessive pressure drop, and/or avoid the advisability of increasing the number of tubes to regulate pressure drop within a reasonable range. The zone of controlled heat transfer must be at least two feet long (and thus significantly longer than insulating ceramic ferrules used in sulfur oxidation boilers) but not more than about eight feet long because the guard tube should end adequately prior to the U-bend and should not reduce heat transfer in more than about 30% of the exchanger length. A downstream edge 536 of ferrule fits snugly heat transfer tube 527. Although not shown in the drawing, it is often desirable to provide a metal tube portion of the ferrule between the core 537 and the exchanger tube 527 thereby assuring structural integrity during installation of the ferrule and during operation of equipment over many years.

Particular attention is directed to carbon core 537 which fills the sandwich zone between the stainless steel shell 539 and the conventional steel heat exchanger tube 527. Such carbon core 537 conducts heat from cylindrical portion 535 to heat transfer tube 527 at a relatively rapid rate which is slower than if no ferrule 532 were employed. Hence, the ferrule body 537 should not be called an insulator because it is not designed to minimize heat transfer. A thickness of 3/16 inch of some insulating materials could preserve the temperature of the hot gas at such a hot temperature that the film boiling problems could develop just downstream of the downstream edge 536 of the ferrule 532. It is important that the gas be cooled and that the liquid be heated during the passage of hot gas through the cylindrical portion 535 of ferrule 532. If the device is to be used as an ethylene flame arrestor, then the thermal conductivity of the multilayer barrier (e.g., shell 539, core 537, heat transfer tube 527), must be within the range from about 0.05 to about 1.6 BTU's per hr per sq ft of barrier per °F. per ft of thickness of barrier. If the sandwich filler material is a solid instead of a gas, then such solid must have a thermal conductivity controlled to be in the range from 0.3 to 1.6 BTU/hr/sq ft/°F./ft. It should be noted that the value of 0.3 BTU/hr/sq ft/°F./ft of thickness of barrier is significantly greater than the thermal conductivity coefficient of most conventional thermal insulators. Similarly, the value of 1.6 BTU/hr sq ft/°F./ft is significantly less than the thermal conductivity coefficient of most conventional thermal conductors. Hence there is basis for treating such range from 0.3 to 1.6 as a unique range of thermal properties for solids.

Instead of forming ferrule body 537 of carbon (e.g., composition of electrical resistors), it can be made from stainless steel mesh compressed to a density of about 10 to 40 pounds per cubic foot. The thickness of stainless mesh core or sandwich zone 537 can desirably be within a range from about 0.05 to about 0.2 inch. Similarly such a sandwich zone 537 can be filled with powdered carbon, compressed to a density within the range from about 10 to about 30 pounds per cubic foot. Various sintered metals and cermets also have the combination of resistance to spalling when subjected to thermal shock, adequate thermal conductivity, and adequate mechanical strength to serve as a sandwich zone 537 between the stainless steel shell 539 and the ordinary steel heat transfer tube 527. If desired, a metal tube portion of the ferrule can be designed to fit against both such core and the exchanger tube, but such option is not shown in the drawings.

Figure 7:
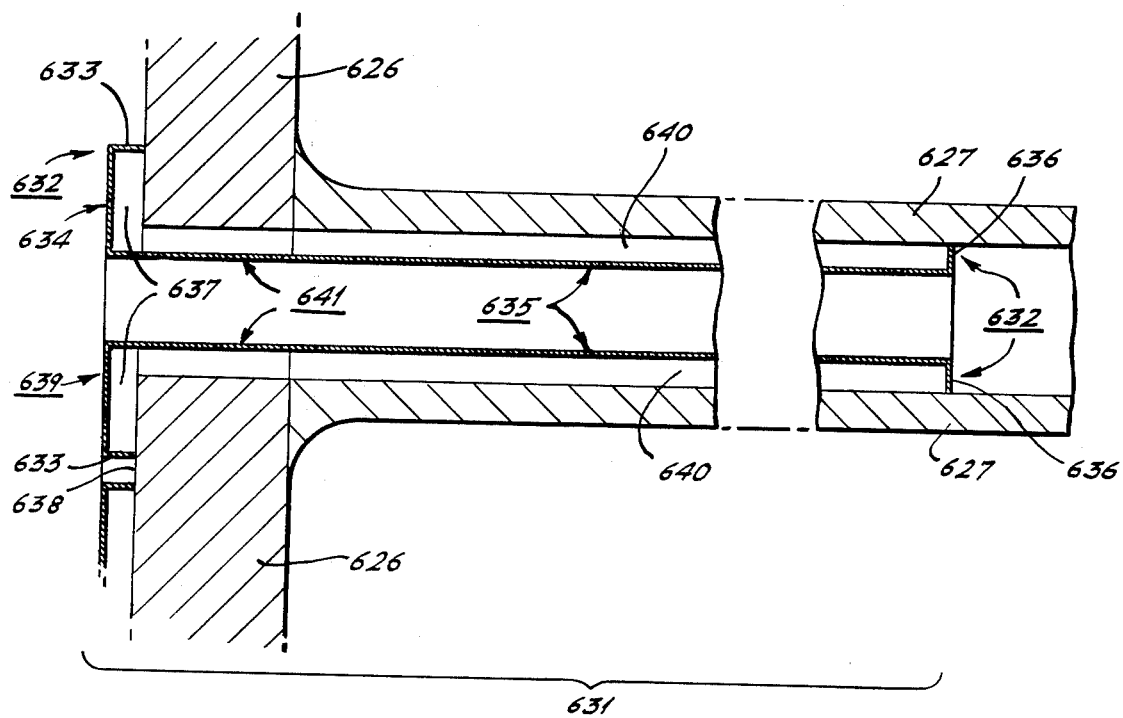
FIG. 7 is a sectional view of a second embodiment of a heat guarding ferrule, exemplifying one use of a gas to modify heat flux at an entry zone.

Instead of a solid, any suitable gas, such as compressed ethylene gas and/or its decomposition products (methane and carbon) conducts heat well enough to fill the space between the stainless steel shell and the ordinary steel heat transfer tube, provided that the gas thickness and length of the modified heat transfer zone are appropriately regulated. As shown in FIG. 7, a stainless steel shell 639 comprises an edge portion 633 abutting the face of tubesheet 626, a rim portion 634, tubesheet guarding portion 641, cylindrical (for guarding heat transfer tube 627) portion 635, and downstream portion 636 positioned against the inside diameter of heat transfer tube 627. The gas in the vapor space 640 between shell 639 and heat transfer tube 627 conducts heat poorly (hence, a thinner thickness is effective). The combination of vapor space 640 and shell 639 distributes the initial cooling of the relatively elevated temperature over several feet of the length of the heat transfer tube 627. The function of vapor space 640 corresponds essentially to that of carbon body 537, in that each conducts heat radially at a rate such that the cooling of the flame front from about 3000° F. to about 1800° F. is accomplished throughout an appreciable length of heat transfer tube, thereby decreasing any propensity for film boiling on the liquid side of the heat transfer tube. The feasibility of constructing the major portion of the emergency cooler from conventional steel instead of stainless steel is a noteworthy advantage of the guard tube or ferrule 632.

Because the tube sheet 626 cannot dissipate heat readily, it is sometimes advantageous to protect it with a greater thickness of vapor space, whereby the inside diameter of tubesheet guarding portion 641 is smaller than the inside diameter of cylindrical tube guarding portion 635, but this is not shown in the drawing. Also, relatively thick vapor space 637 insulates and protects the face of the tube sheet.

Because significant labor is required for inserting a great number of stainless steel shells into a great number of heat transfer tubes, there are advantages to providing a ferrule assembly, such as shown in FIGS. 5 and 5a, scheduled for simultaneous insertion of a bundle of guard tubes into a bundle of heat transfer tubes.

An assembly 442 of stainless steel shells 439 is shown in FIGS. 5 and 5a. The space between rims is eliminated so that all rims merge into an assembly face sheet 443. Such face sheet 443 has openings on the same axes as a tube bundle for which it is designed. In order to simplify the insertion of such assembly 442 into its corresponding tube bundle, some of the central downstream portions 436 extend farther downstream than those near the circumference of the assembly.

Figure 8:
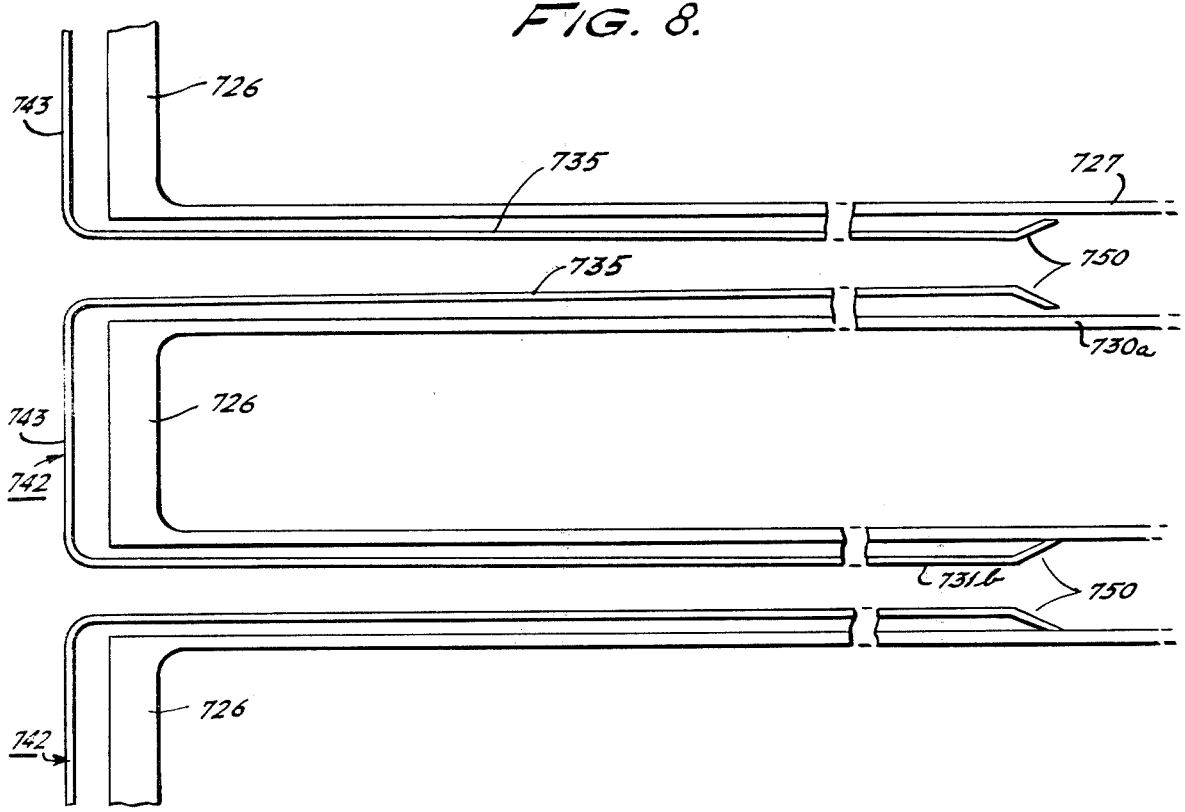
FIG. 8 is a sectional view of a portion of the assembly of heat protective guard tubes of FIGS. 5, 5a when installed in heat exchange tubes of FIGS. 1–3.

As shown in FIG. 8, a tubesheet 726 is fitted with a plurality of heat exchanger tubes 727. A guard tubesheet 743 of an assembly 742 of guard tubes (FIGS. 5, 5a) has zones which connect what would be the rim portions of the ferrules extending into the heat exchanger tubes 727. The cylindrical portions 735 provide for a vapor space. A downstream edge 750 fits against heat exchanger tube 727. The linear cross section of the vapor space is approximately rectangular in both FIGS. 7 and 8, which differ primarily in the disclosure of guard tubesheet 743 in FIG. 8.

Figure 9:
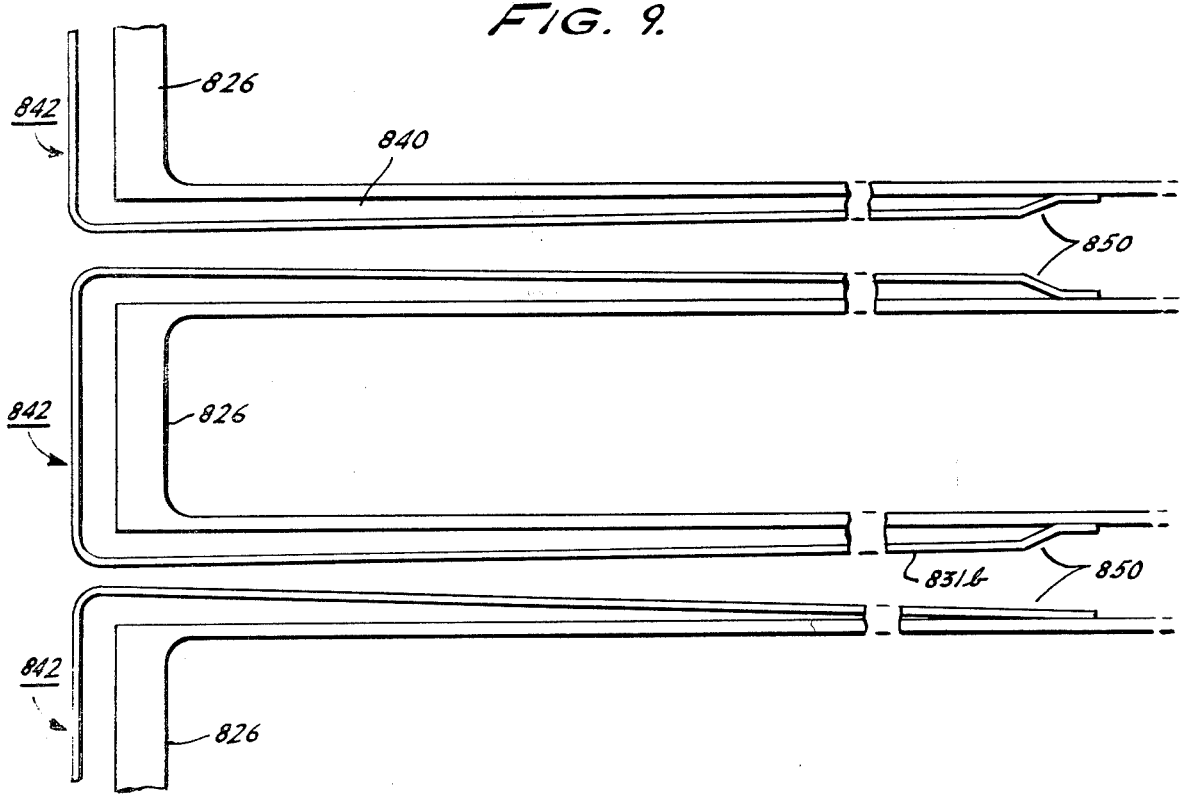
FIG. 9 is a cross-sectional view of a modification of the embodiment of FIG. 8, which modification features a gas zone the cross section of which is tapered instead of uniform thickness.

The need for modification of the heat transfer characteristics is greatest near the inlet and less at the downstream portion of a guard tube. It is easier to design and construct a guard tube having a generally uniform annular vapor space, so that a linear section provides an approximately rectangular zone as shown in FIGS. 7 and 8. Another embodiment would provide a tapered triangular linear section instead of an approximately rectangular section for the vapor zone. As shown in FIG. 9, vapor space 840 is thicker near tube sheet 826 than near a downstream edge 850. The embodiment of FIG. 9 otherwise resembles those of FIGS. 5, 5a, 7 and 8. The heat transfer role of the vapor can be about equivalent whether ethylene or its decomposition products is the vapor when the device is used as an ethylene flame suppressor. If used for emergency cooling of another gas, the vapor space fulfills its role of approximately halving the overall heat transfer rate throughout the zone of modified heat transfer.

Various modifications of the invention are possible without departing from the scope of the appended claims.

The invention claimed is:

1. In an emergency cooling system in which a quiescent pool of liquid in a vat serves to cool a fluid stream flowing through a plurality of generally parallel generally horizontal heat transfer tubes immersed at a significant depth in such liquid, said emergency cooling system being able to cool small heat surges without raising said liquid to the boiling point of the liquid, and said emergency cooling system being able to cool large heat surges by boiling away some of the liquid, and said emergency cooling system having some susceptibility for film boiling adjacent the liquid side of some initial portions of some heat transfer tubes, the method of decreasing such susceptibility for film boiling and for decreasing the peak temperature to which an initial portion of a heat transfer tube is heated during a heat surge, which method consists of:

modifying the thermal conductivity characteristics of an initial portion of each of said heat transfer tubes, said portion being from about 2 feet to about 8 feet in length, said portion of modified thermal conductivity characteristics having a thermal conductivity within the range from about 0.05 to about 1.6 BTU/hr/sq ft/°F./ft and said modified portion being adapted to withstand such heat surge without spalling, buckling, or other thermal shock injury, and said modified heat transfer characteristics of the initial portion of the tubes promoting evaporative liquid cooling of the fluid stream so that all portions of the tube can promote cooling of the fluid stream without film boiling.

2. In an emergency cooling system for cooling an emergency unscheduled large heat surge in a flowing stream of fluid, said emergency cooling system comprising a vat, a quiescent heat transfer liquid in said vat, on array of generally parallel generally horizontal heat transfer tubes immersed at a significant depth in said quiescent heat transfer liquid, whereby there is the potentiality of a heat surge heating the quiescent liquid to the boiling point and a portion of said liquid is boiled away above the array of tubes, the improvement which consists of:

associating thermal conductivity modifying means with an initial 2 feet to 8 feet portion of substantially each of said heat transfer tubes, whereby such modified portion of a tube has a thermal conductivity which is within a range from about 0.05 to about 1.6 BTU/hr/sq ft/°F./ft, whereby carbon steel may be employed for said heat transfer tubes, said thermal conductivity modifying means withstanding the thermal shock of said unscheduled large heat surge without spalling, cracking, or related malfunction, and whereby film boiling is effectively prevented.

3. The heat transfer control system of claim 2 in which an annular zone of modified thermal conductivity has a thickness within the range from 0.01 to 0.20 inch.

4. The heat transfer control system of claim 2 in which an annular zone of modified thermal conductivity has a heat transfer coefficient which is within the range from about 30 to about 120 BTU/hr/sq ft/°F.

5. The heat transfer control system of claim 2 in which an annular zone of modified thermal conductivity has a heat flux which is within the range from about 60,000 to 240,000 BTU/hr/sq ft.

6. The system of claim 2 in which at least one supplemental metal guard tube extends throughout at least substantially all of the length of said annular zone of modified thermal conductivity, whereby the thermal conductivity characteristics of the zone sandwiched between a plurality of metal tubes dominates the thermal conductivity characteristics for such initial portion.

7. The system of claim 2 in which an array of metal guard tubes extends from a guard tube sheet, whereby the array of guard tubes is more readily insertable into a corresponding array of heat transfer tubes.

8. The system of claim 2 in which the zone sandwiched between a plurality of metal tubes in the thermal conductivity modifying means is a vapor zone.

9. The system of claim 8 in which the vapor zone is tapered to provide a greater thickness at an upstream entry zone than at the downstream end of such vapor zone.

* * * * *

UNITED STATES PATENT AND TRADEMARK OFFICE
CERTIFICATE OF CORRECTION

PATENT NO. : 4,254,819
DATED : March 10, 1981
INVENTOR(S) : G. Richard Worrell

It is certified that error appears in the above—identified patent and that said Letters Patent is hereby corrected as shown below:

Column 9, line 21, Claim 2, "parallet" should read -- parallel --.

Signed and Sealed this

Thirtieth Day of June 1981

[SEAL]

Attest:

RENE D. TEGTMEYER

Attesting Officer

Acting Commissioner of Patents and Trademarks